UNITED STATES PATENT OFFICE.

BENJAMIN TALBOT, OF PENCOYD, PENNSYLVANIA.

LINING METALLURGICAL FURNACES.

SPECIFICATION forming part of Letters Patent No. 540,465, dated June 4, 1895.

Application filed December 6, 1894. Serial No. 531,019. (No specimens.)

*To all whom it may concern:*

Be it known that I, BENJAMIN TALBOT, a subject of the Queen of Great Britain, (but having declared my intention of becoming a citizen of the United States,) and a resident of Pencoyd, Montgomery county, Pennsylvania, have invented certain Improvements in Lining Metallurgical Furnaces, of which the following is a specification.

The object of my invention is to effect the lining or repair of linings of open hearth or like furnaces in a more convenient and acceptable manner than at present, and this object I attain in the manner which I will now proceed to describe.

Previous to my invention it has been customary to mix the highly burnt calcareous or magnesian material which is to constitute the basic lining of the furnace with fluid tar, asphaltum, or the like, so as to make a plastic and adhesive mass, before the introduction of the same into the furnace. The necessity of mixing the material whenever it is wanted for use, or keeping the mass plastic by means of heat, if it is kept in stock, or heating a mass of the material when required, is often inconvenient. In carrying out my invention, therefore, I prepare the basic material, such as previously burnt lime, dolomite, magnesite, or other basic substance, and mix with it, in a dry state, mineral pitch, bitumen, or other solid mineral or vegetable fusible hydrocarbon, so that the compound does not become plastic, but remains in a powdered condition.

In lining a furnace, the latter, which is preferably of the usual Siemens regenerative type, is first heated to a high temperature and the mixture of powdered basic material and pitch is then thrown into the furnace so as to be deposited where required. The pitch is immediately set on fire by the heat of the furnace and serves to retain the mass of basic material in the spot to which it was directed when thrown into the furnace, whether the spot be on the bottom or walls of the furnace, the throwing in of the mixture being continued until the hearth has taken the desired shape and size. The heat of the furnace burns away all of the carbonaceous residue of the pitch and the basic material is glazed or burned on in a solid mass, so that the furnace is provided with a substantially pure basic lining.

The basic material which I prefer to use is the previously burnt magnesian lime, commonly called dolomite, and the pitch is the ordinary mineral pitch of commerce, although magnesite or other basic material may be used in carrying out my invention, and other solid hydrocarbon than mineral pitch may also be employed if desired. The basic material and the pitch can be ground together so as to become intimately mixed, or they may be ground separately and afterward mixed by sprinkling the desired percentage of powdered pitch among the basic material. The percentage of pitch may vary according to circumstances. Ordinarily from five (5) to ten (10) per cent. will be sufficient.

In making repairs to the hearth after a charge of steel has been made, magnesian lime stone, magnesite, &c., may be used without being previously burned, the raw stone being ground and mixed with the ground pitch prior to being thrown upon the place at which the desired repairs are to be made. I prefer to use the raw stone, however, only in places which are about the top of the bath of metal, and when the repairs are of a light character.

Although the instant melting of the pitch, on the introduction of the same in the furnace, will prevent any material scattering of the mass of basic material, when magnesite, or other material incapable of being "slaked" by the addition of water, is employed as the basic material, I may add water to the mixture in such quantities as may not change the granular character of the mixture.

Having thus described my invention, I claim and desire to secure by Letters Patent—

1. The mode herein described of lining or repairing the linings of metallurgical furnaces, said mode consisting in introducing into the furnace while the same is highly heated, basic material mixed with solid fusible hydrocarbon, the mixture being in a powdered or granular state, substantially as specified.

2. The mode herein described of lining or repairing the linings of metallurgical furnaces, said mode consisting in introducing into the furnace while the same is highly heated, basic material mixed with solid fusible hydrocarbon, the mixture being in a powdered or granular state, and then completely burning out the finely divided solid and fusible hydrocarbon, in order to form a lining of substantially pure basic material, substantially as specified.

3. The within described compound for lining or repairing linings of basic furnaces, said compound consisting of ground basic material and solid fusible hydrocarbon also reduced to fine particles, the two being mixed to form a powdered or granular mass, substantially as specified.

In testimony whereof I have signed my name to this specification in the presence of two subscribing witnesses.

BENJAMIN TALBOT.

Witnesses:
 HENRY HOWSON,
 JOSEPH H. KLEIN.